United States Patent
Bailey

[11] Patent Number: 5,996,946
[45] Date of Patent: Dec. 7, 1999

[54] HEIGHT GAUGE SUPPORT STAND

[75] Inventor: Boice R. Bailey, New Stanton, Pa.

[73] Assignee: Boice Industrial Corporation, Ruffsdale, Pa.

[21] Appl. No.: 09/131,191

[22] Filed: Aug. 7, 1998

[51] Int. Cl.[6] ........................................... A47F 5/00
[52] U.S. Cl. ........................ 248/125.1; 248/127; 33/555
[58] Field of Search ........................... 248/125.1, 122.1, 248/176.1, 295.11, 159, 127, 371, 124.1, 158, 676, 188, 188.2, 346; 411/180, 137; 33/501.02, 531, 555, 533, 572

[56] References Cited

U.S. PATENT DOCUMENTS

| | | | |
|---|---|---|---|
| 2,177,921 | 10/1939 | Zofrey | 474/199 |
| 2,545,881 | 3/1951 | Graham | 336/135 |
| 3,044,740 | 7/1962 | Pearce et al. | 248/124.2 |
| 3,348,421 | 10/1967 | Boice | 74/89 |
| 3,599,339 | 8/1971 | Adamczyk | 33/172 |
| 3,672,620 | 6/1972 | Fink | 248/125 |
| 3,811,192 | 5/1974 | Christensen | 33/170 |
| 3,833,195 | 9/1974 | Anton | 248/125 |
| 3,996,669 | 12/1976 | Anichini | 33/172 E |
| 4,219,934 | 9/1980 | Davitt, Jr. | 33/168 B |
| 4,284,257 | 8/1981 | Murkens | 248/125 |
| 4,336,656 | 6/1982 | Lewis | 33/174 E |
| 4,458,423 | 7/1984 | Sakata et al. | 33/169 R |
| 4,498,241 | 2/1985 | Nakaoki | 33/172 R |
| 4,521,967 | 6/1985 | Uchino | 33/169 R |
| 4,679,326 | 7/1987 | Takizawa et al. | 33/170 |
| 4,680,869 | 7/1987 | Murkens | 33/533 |
| 5,137,235 | 8/1992 | Wentworth et al. | 248/124 |
| 5,208,996 | 5/1993 | Schaldach | 33/644 |
| 5,704,249 | 1/1998 | Krauska | 74/434.8 A |
| 5,791,639 | 8/1998 | Johnston et al. | 269/41 |

OTHER PUBLICATIONS

Starn Tool & Manufacturing Co. Brochure dated earlier than Jan. 6, 1998.

*Primary Examiner*—Ramon O. Ramirez
*Assistant Examiner*—Tan Le
*Attorney, Agent, or Firm*—Richard K. Thomson

[57] ABSTRACT

A support stand for positioning a precision gauge for checking the dimensions of an article. The base is stable having three supporting feet and being heavier than many such support bases. The base is tapered with finger grooves to fit well into the user's hand and provides an adjustment screw which rotates about a horizontal axis so reaction forces are directed downwardly into the support plate rather than creating a shearing, destabilizing force. The adjustment screw has as large a diameter as practical to reduce the magnitude of the tangential force needed to produce rotation and its rotation reacts a nub against the substantially vertical support post to tilt it, and the precision gauge supported thereby. An L-shaped bracket can be inverted to provide increased flexibility in measuring different size articles. Squareness checking rails are provided on the front and back surfaces to enhance the flexibility of using this support stand.

20 Claims, 5 Drawing Sheets

HEIGHT GAUGE SUPPORT STAND

The present invention is directed to a height gauge support stand. More particularly, the present invention is directed to a support stand which provides ease of maneuvering and adjustment when manipulating a precision gauge to measure the height of an article.

BACKGROUND AND SUMMARY OF THE INVENTION

In tool and machine shops, precision gauges are used to verify that a machined article has been manufactured within the desired tolerances. A height gauge is used to verify that the vertical dimension is what it ought to be. A precision gauge is mounted on a support stand and positioned upon a granite surface plate that has been polished to have a surface flatness within millionths of an inch. Gauge blocks which have been ground and lapped to a particular dimension are used to calibrate the height gauge and the measurement transferred to the machined article to verify that it is within tolerance.

A number of support stands are available for supporting a precision gauge for comparing an article to a known standard as part of this quality control check in a machining or assembly operation. These supports typically have a vertical post to which a support arm is attached by a bracket. The support arm mounts the precision gauge and can be moved up and down the post for rough positioning of the gauge relative to the gauge block. Typically, a fine adjustment is available to position the gauge finger on the top of the gauge block. A rotatable dial on the gauge permits the force with which the gauge finger engages the gauge block to be zeroed out so the gauge finger is set at the precise height of the gauge block. The height gauge support stand can then be slid over the gauge plate surface to position the gauge finger above a machined article to determine if it is within the desired tolerance range. If several articles or dimensions on the same article are to be measured, typically a plurality of height gauge supports will be utilized so that once set, the gauge can be left in its adjusted position and simply repeatedly used to measure sequential articles. Most such gauge supports have a machined surface that may be brought into contact with a lateral face of the article to check its squareness.

One such support is described in U.S. Pat. No. 4,284,257 issued to David Murkens. This support has a split plate design with the upper and lower halves interconnected along one end face by a spring plate bolted to each half. Precision adjustment is effected by rotating a knob about a vertical axis pushing against the lower plate in order to tilt the upper plate with a vertical support post and the gauge attached. Due to the large number of parts, this design is expensive to manufacture and assemble. Also, its operation requires two hands, one to steady the stand and one to rotate the adjustment knob. In addition, the torquing of the adjustment screw about the vertical axis can cause the entire support to turn the article engaging tip of the height measuring gauge off the workpiece being measured. This can slow down the measuring process and aggravate the workman.

A second known device is available from Starn Tool and Manufacturing Company. This gauge support has a machined longitudinal beam that slides inside an outer gauge support block. The longitudinal beam has three different dimensions and an aperture which must be machined from a solid block of material and the support block must have a precision internal opening machined, as well. An adjustment screw extends vertically through a portion of the support block and engages an end of the longitudinal beam in order to permit tilting adjustment of the beam and the post it supports. This height measuring gauge suffers from the same problems associated with the Murkens device: it is expensive to manufacture, rotation of the adjustment knob requires two hands and torques the entire support about a vertical axis, which can cause movement of the article engaging finger.

The present invention overcomes the difficulties of the prior art by providing an adjustment screw that rotates about a horizontal axis on a front portion of the base, where it is out of the way. The base of the support stand is tapered to fit easily in the hand of the worker with grooves on each side for the fingers and thumb. The base can be gripped between the thumb and middle fingers while the index finger is used to rotate the adjustment screw permitting one-handed operation. In this manner, the force is generally down into the surface plate increasing resistance to movement of the base rather than creating a shear force between the surface plate and base tending to cause movement. Also, the adjustment knob can be rotated by pulling or pushing the periphery of the knob toward the thumb or middle finger of the hand gripping the base such that the component of the force that is not reacted into the support is offset by an opposing force from the thumb or middle finger.

The base is heavier than many others which are available, making it more stable. Further, the base has three point contact with the surface plate which also improves stability since three point contact will not rock, although four point contact might. In addition, three point contact reduces friction with the plate making it easier to move over the surface plate when being positioned relative to the workpiece.

The thread pitch on the adjustment knob screw is finer than most adjustment screws making the positioning of the gauge finger easier to accomplish. The fact that the adjustment screw is larger in diameter makes it easier to turn since the point at which the force is applied is further from the rotational axis increasing the length of the moment arm which reduces the magnitude of the tangential force required to produce rotation. Squareness checking rails are provided on both the front and rear faces of the base to enhance the utility of the device.

Various other features, advantages and characteristics of the present invention will become apparent to one of ordinary skill in the art after a reading of the following specification.

BRIEF DESCRIPTION OF THE DRAWINGS

The preferred embodiment(s) of the present invention is/are described in conjunction with the associated drawings in which like features are indicated with like reference numerals and in which.

DETAILED DESCRIPTION OF PREFERRED EMBODIMENT(S)

Figure 1:
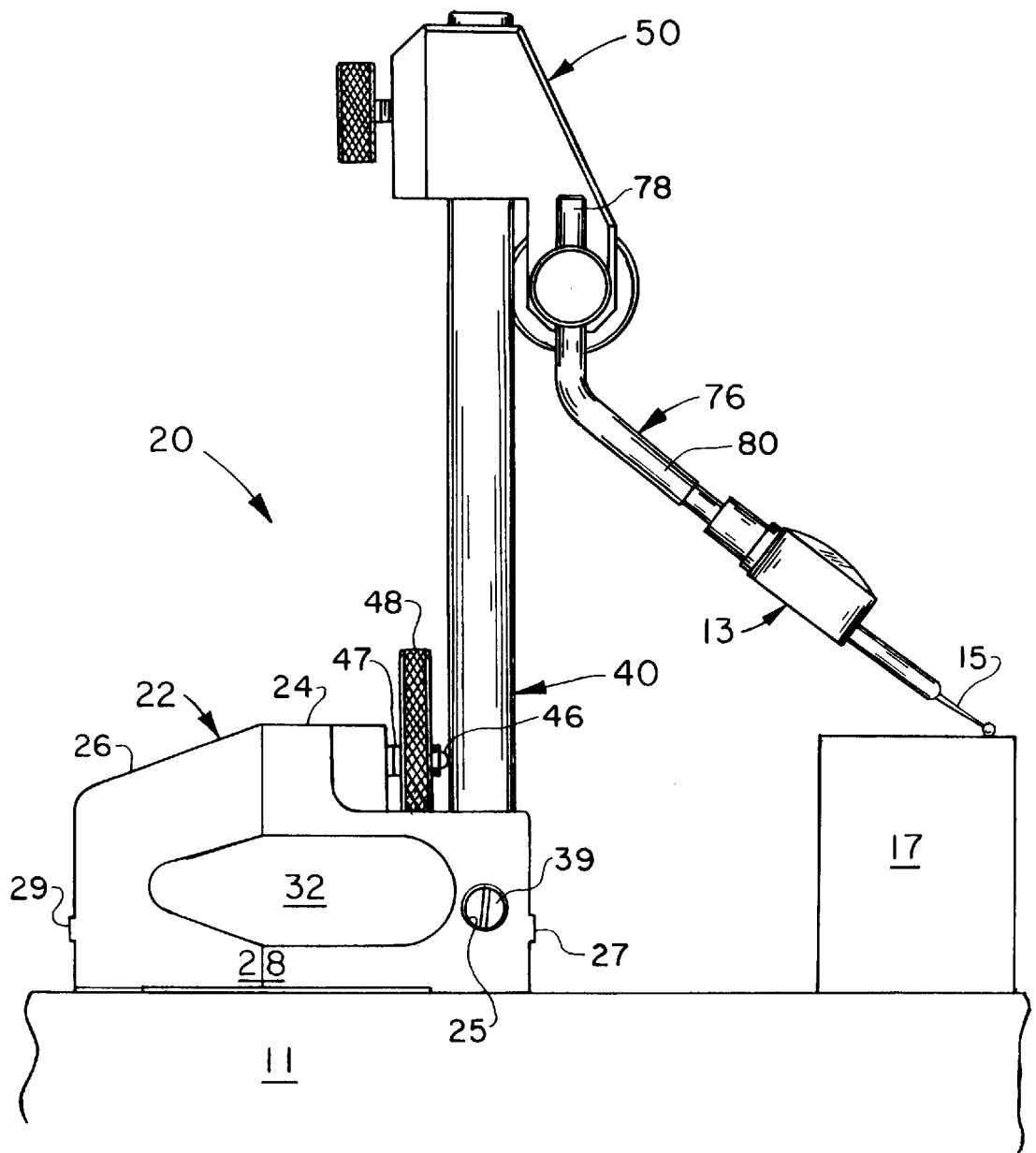
FIG. 1 is a side view of a first embodiment of the height gauge support stand of the present invention.

A first preferred embodiment of the height gauge support stand of the present invention is shown in FIG. 1 generally at 20. Support stand 20, shown in FIG. 1 sitting on gauge plate 11 supporting precision gauge 13 with gauge finger 15 in contact with gauge block 17, includes base 22, vertical post 40, L-shaped bracket 50, and support arm 76.

Figure 6:
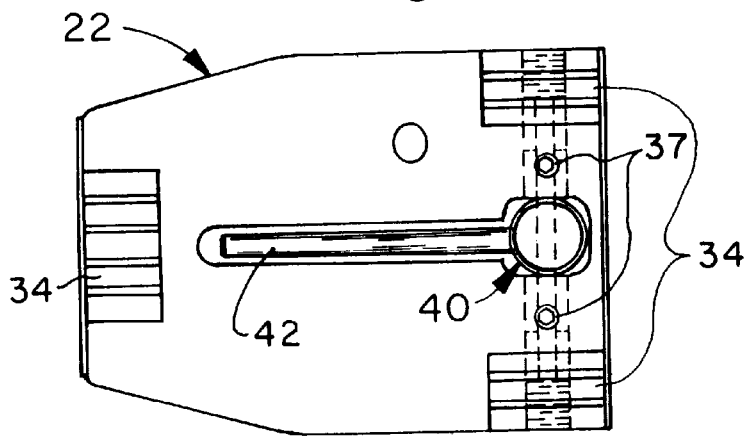
FIG. 6 is a bottom view of the first embodiment.

Base 22 has a generally rectangular front portion 24 and a tapered rear portion 26 so that it more easily fits in a workman's hand. In addition, sides 28 and 30 have finger grooves 32 extending along each side to facilitate grasping of base 22. Base 22 is heavier than many similar support bases. By way of example and not limitation, base 22 is made of cast iron or steel. In the configuration shown, the steel embodiment weighs 3 pounds, 4 ounces. As seen in FIG. 6, base 22 has three supporting feet or pads 34. The positioning of these pads 34, two in the front and one in the rear of block 22, provides stability and facilitates forward and back sliding of base 22 over gauge plate 11. Base 22 has a rail 27 along the front side and a second rail 29 along the rear which can be used to check the squareness of a workpiece in a manner typical in the industry. What is unusual about the present design is the placement of two such rails 27, 29, one at the front and the other at the rear to increase the utility of the height gauge support stand 20.

Figure 3:
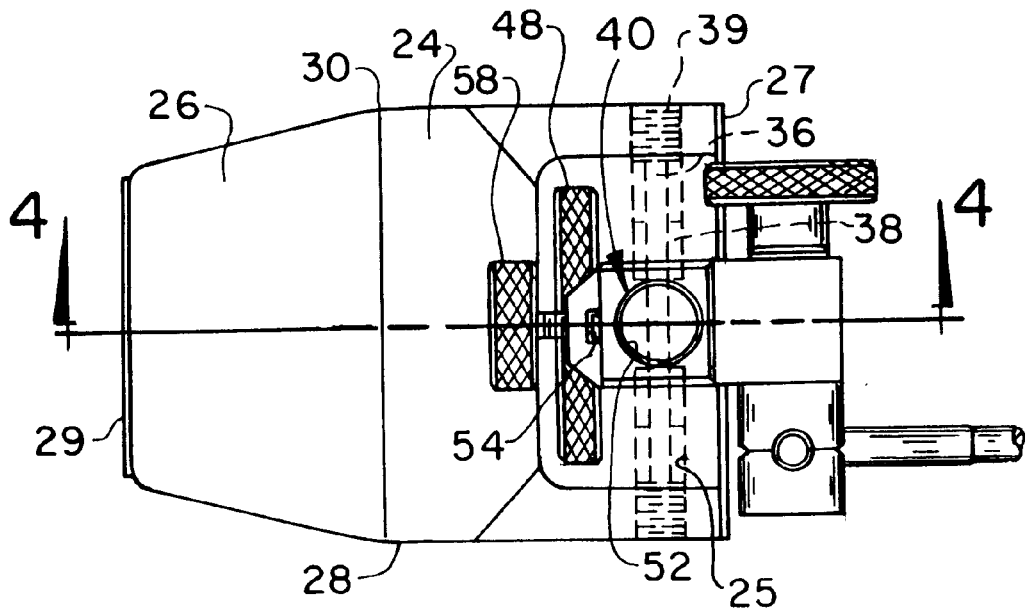
FIG. 3 is a top view of the height gauge support stand of the first embodiment.
Figure 4:
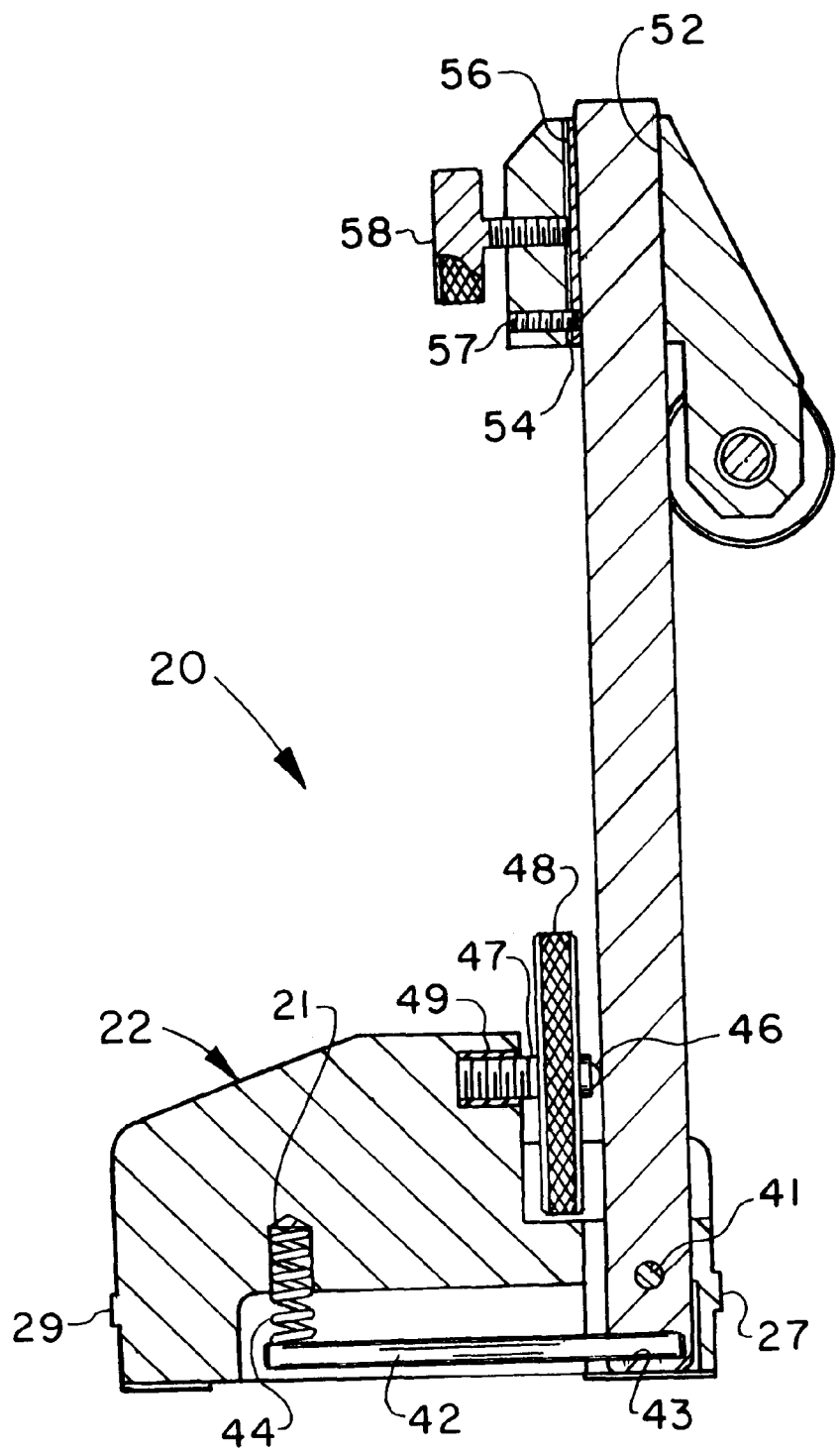
FIG. 4 is a cross-sectional side view of the first embodiment as seen along line 4—4 of FIG. 3.
Figure 7:
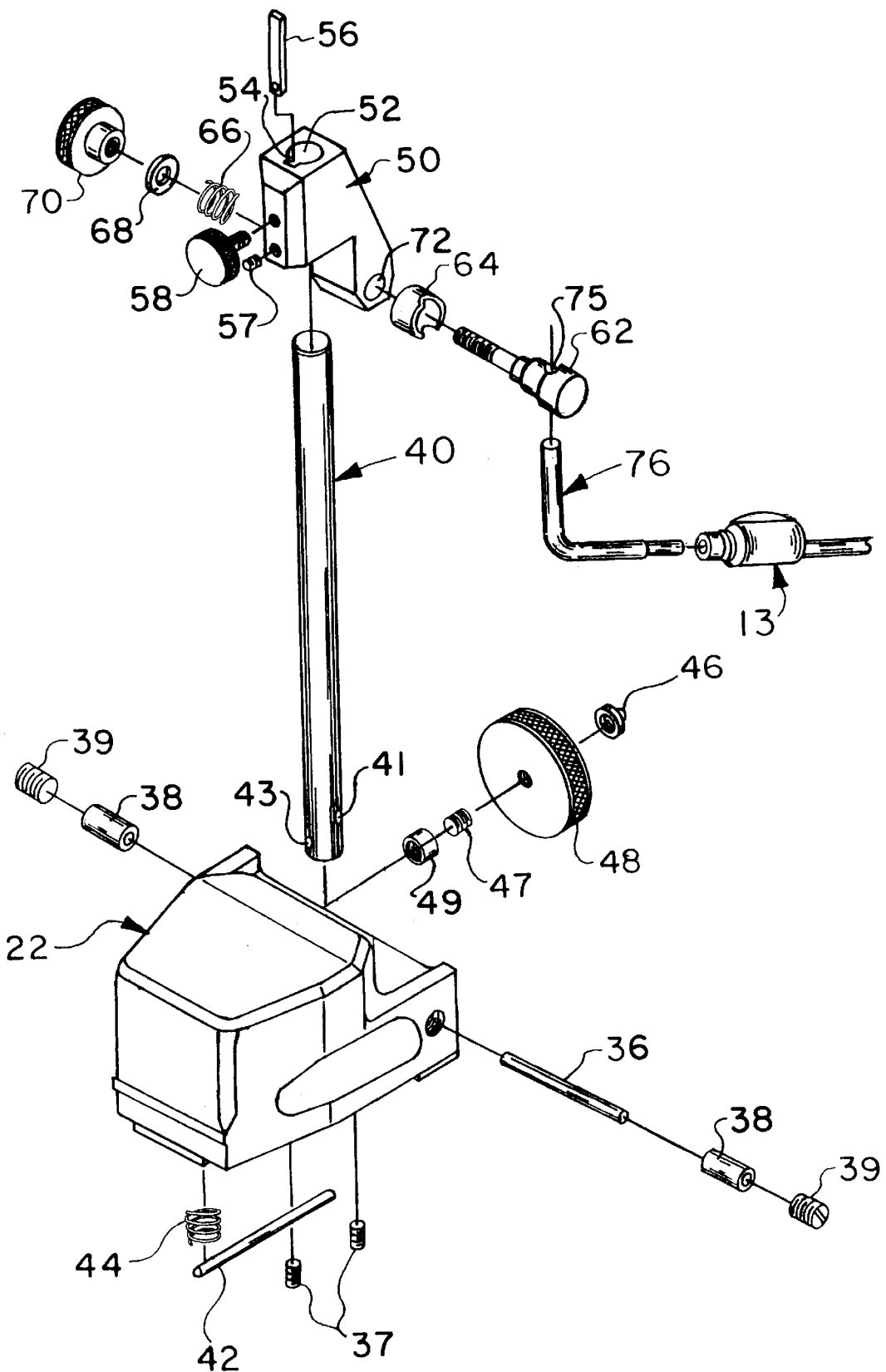
FIG. 7 is an exploded elevational view of the first embodiment of the present invention.

Support post 40 is mounted on base 22 to extend generally vertically therefrom. As best seen in FIGS. 3 and 7, a pivot axle is formed by a dowel pin 36 which extends through a lateral aperture 41 in post 40. Dowel pin 36 is received in bushings 38 mounted in base 22 on either side of post 40. Plugs 39 are threaded into aperture 25 extending through base 22 to retain bushings 38 against lateral movement. Set screws 37 are inserted through the bottom of base 22 to engage bushings 38 and prevent their rotational movement so dowel pin turns in, and not with, bushings 38. Spring arm 42 is affixed in aperture 43 in post 40 substantially perpendicular to lateral aperture 41. A spring 44, preferably a coil spring, engages the distal end of spring arm 42 and provides a light torsional force tending to turn post 40 back toward base 22 into push nub 46 (FIG. 4). The end of spring 44 is received in a locating recess 21 in base 22.

Adjustment knob 48 is positioned in the front section 24 of base 22 where it is out of the way of the grip of the workman and may be easily engaged by the worker's index finger to fine tune the adjustment of the gauge finger 15. Adjustment knob 48 is mounted on threaded pin 47. Pin 47 is received by a split nut 49 which is received in front section 24. The pitch of the adjustment knob 48 is ¼-48, finer than most such adjustment devices. This means it takes more rotation of the knob 48 to produce an equivalent amount of movement of post 40 and its attached gauge 13. This makes the fine adjustment of the positioning of gauge finger 15 easier. Since the rotational axis of the adjustment knob is horizontal, the force is reacted into the gauge plate 11. This is in contrast to many of the prior art devices in which the rotational axes of the adjustment knobs are vertical. In such devices, rotating the adjustment knob can produce a shearing force causing sliding of the engagements between the bases and their support surfaces. These knobs typically require two handed operation since the knobs are toward the rear of the base, under the overarching hand of the worker. Normal operation involves grasping the front portion with the left hand to prevent movement of the base, and sliding the right hand back to grasp the knob with the thumb and forefinger.

Figure 5:
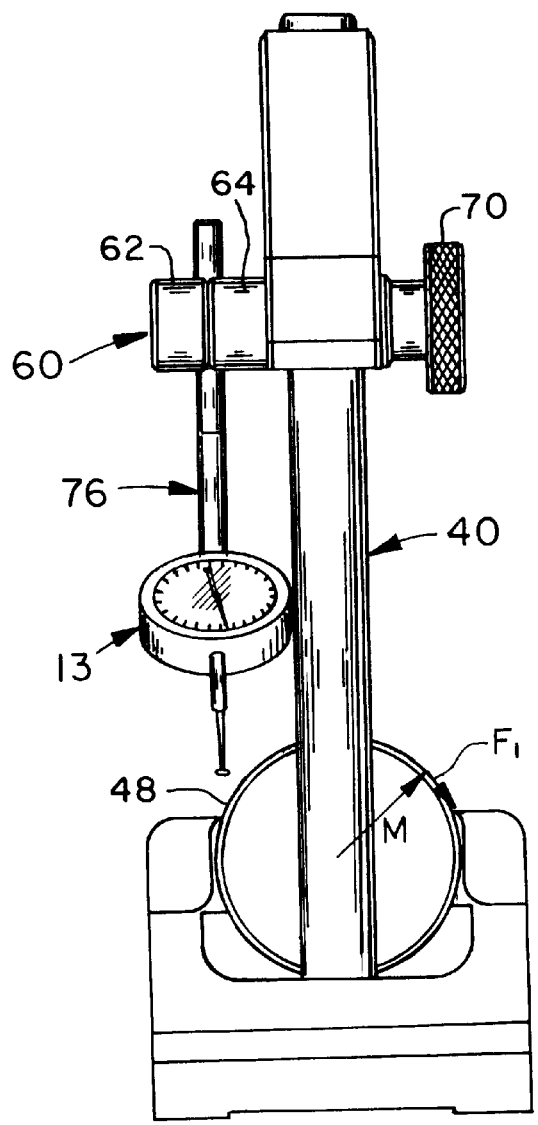
FIG. 5 is a front view of the first embodiment of the support stand of the present invention.

Knob 48 is large in diameter, indeed as large as practical, to reduce the magnitude of the tangential force needed to produce rotation. Torsional force, or the moment, is a product of the tangential force $F_1$ and the length of the moment arm M (FIG. 5). By increasing the length of M, the magnitude of $F_1$ can be reduced. As a result, a relatively small force will permit knob 48 to be rotated producing pivotal movement of post 40 about dowel pin 36. Pushing nub 46 will move into or away from post 40 either compressing or permitting expansion of spring 44.

L-shaped support bracket 50 is adjustably attached to post 40. Bracket 50 has an axial bore 52 extending there through which receives post 40. A recess 54 parallels bore 52 which receives a elongated brass plate 56. A small screw 57 is threaded into plate 56 and retains it in recess 54. Adjustment knob 58 pivots plate 56 between a clamping position against post 40 and an unclamped position in which bracket 50 can be moved up and down post 40 to accommodate various height articles.

Figure 2:
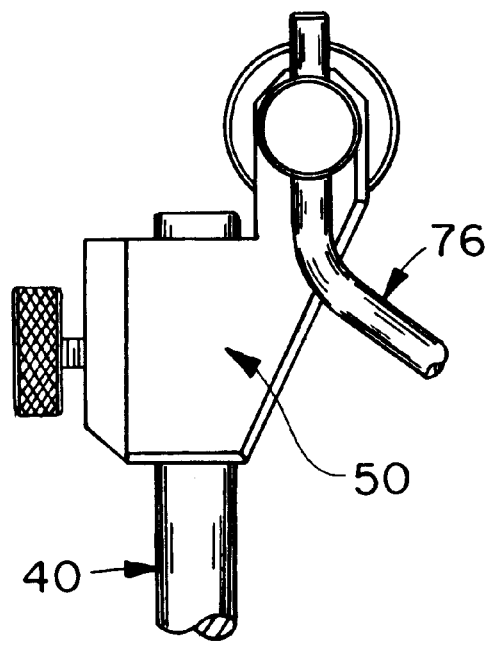
FIG. 2 is a side view depicting the L-shaped bracket in an inverted configuration.

Bracket 50 mounts support arm 76 on post 40. L-shaped bracket 50 can be inverted (FIG. 2) to enable height gauge 20 to be utilized in measuring taller articles. Support arm 76 has an upper arm portion 78 and a lower arm portion 80 that have an obtuse included angle of, for example, 135°. It will be understood that even larger articles can be accommodated by inverting support arm 76. A conventional clamping mechanism 60 can be used to secure support arm 76 to bracket 50. As seen in FIG. 7, clamping mechanism 60 includes a threaded shoulder bolt 62, a complementary clamping cup 64, a biasing spring 66, a washer 68 and a locking nut 70. Shoulder bolt 62 is inserted through cup 64, through hole 72 in bracket 50, through spring 66, through washer 68 and nut 70 is threaded onto end 74 of bolt 62. After support arm 76 is inserted into hole 75 in shoulder bolt 60, tightening of clamping nut 70 will cause clamping cup 64 to grip arm 76 in an adjusted position.

The height gauge support stand 20 of the present invention provides improved feel and handleability of such devices. The base can be gripped by inserting one's thumb in the groove 32 on side 30 and one or more fingers in groove 32 on side 28 (by a right-handed operator, reversed for a left-handed operator). The index finger can be left to rest comfortably atop adjustment knob 48. The base 22 has three point contact with its underlying support to facilitate forward and back movement. A rough height adjustment can be effected by loosening knob 58 and repositioning bracket 50 on post 40. A somewhat finer adjustment can be accomplished by loosening locking nut 70 and moving support arm 78 up or down as necessary. Finally, fine adjustment is accomplished by rotation of knob 48 left or right to tilt post 40, with arm 78 and gauge 13, fore or aft to bring finger 15 into engagement with the top of a gauge block 17 or an article (not shown) to be checked. The gauge is then used in a conventional manner, being adjusted to zero out the force exerted by finger 15 to bring the gauge finger 15 to the exact height. Gauge finger 15 is then used to check an article to see if it is within acceptable tolerance ranges.

Various changes, alternatives and modifications will become apparent to one of ordinary skill in the art following a reading of the foregoing specification. For example, although the features of the base 22 and L-shaped bracket 50 are quite angular, certain of those features may be softened (rounded) to facilitate casting and to eliminate stress buildup points. It is intended that any such changes, alternatives and modifications as fall within the scope of the appended claims be considered part of the present invention.

I claim:

1. A support stand for a height gauge comprising:
   a) a base for sitting on a surface;
   b) a substantially vertical post pivotally attached to said base;
   c) a support arm for receiving a precision gauge and supporting the gauge relative to a workpiece positioned on said surface;
   d) means for adjustably connecting said support arm directly to said post;
   e) an adjustment knob for permitting fine adjustment of a position of the precision gauge relative to said workpiece, said adjustment knob being rotatable about a substantially horizontal axis to react any reaction forces downwardly into said surface, rotation of said adjustment knob causing pivoting of said substantially vertical post and said support arm adjustably connected thereto relative to said base.

2. The support stand of claim 1 wherein said base is tapered being smaller on a rear portion than on a front portion so as to fit easily into a workman's hand.

3. The support stand of claim 2 wherein said tapered base further comprises a pair of longitudinal grooves extending along a pair of lateral sides of said tapered base to facilitate gripping of said base.

4. The support stand of claim 1 wherein said adjustment knob has a large diameter to facilitate rotation of said adjustment knob by reducing a magnitude of tangential force needed to produce a torsional force of sufficient magnitude to cause said rotation by increasing a length of a moment arm between said rotational axis and a peripheral portion of said adjustment knob.

5. The support stand of claim 1 wherein said base has three pads, two on the front corners and one in the rear center, which support said stand on the surface.

6. The support stand of claim 1 further comprising a rail positioned along a surface of said base for checking squareness of said workpiece.

7. The support stand of claim 6 further comprising a rail positioned along each of a front and a rear surface of said base to permit squareness checking by each said surface.

8. The support stand of claim 1 wherein said means for adjustably connecting said support arm to said post further comprises a substantially L-shaped bracket adjustably secured to said post, said bracket having a laterally extending opening for receiving a holder.

9. The support stand of claim 8 wherein said substantially L-shaped bracket is mountable in an inverted position to permit different sized workpieces to be accommodated.

10. The support stand of claim 8 wherein said substantially L-shaped bracket has an axial bore extending therethrough which receives a portion of said substantially vertical post, said bore having a recess which receives a brass plate which is displaceable by a locking screw into engagement with said post to lock said L-shaped bracket in place relative to said post.

11. The support stand of claim 1 further comprising a pivot axle engaging said substantially vertical post to permit tilting movement of said post relative to said base.

12. The support stand of claim 11 wherein said pivot axle comprises a dowel pin extending through a lateral bore in said vertical post.

13. The support stand of claim 12 wherein said dowel pin rotates in bushings positioned on each side of said post.

14. The support stand of claim 11 further comprising a spring arm received in a bore in said post, an axis of said spring arm being substantially perpendicular to an axis of said pivot axle.

15. The support stand of claim 14 further comprising a spring reacting against an end of said spring arm remote from said post to bias an upper portion of said post into contact with a portion of said adjustment knob.

16. The support stand of claim 15 wherein said spring is a helical spring.

17. The support stand of claim 1 further comprising a split nut received in a portion of said base, said split nut receiving an adjustment screw which is connected to said adjustment knob.

18. The support stand of claim 1 further comprising a push nub attached to said adjustment knob which contacts said substantially vertical post and causes it to pivot as said adjustment knob is rotated.

19. A support stand for a height gauge comprising:
   a) a base for sitting on a surface;
   b) a substantially vertical post pivotally attached to said base;
   c) a pivot axle extending through a lower portion of said vertical post, the ends of which are received in said base to permit pivotal movement of said vertical post;
   d) a support arm for receiving a precision gauge and supporting the gauge relative to a workpiece positioned on said surface;
   e) means for adjustably connecting said support arm to said post;
   f) an adjustment knob for permitting fine adjustment of a position of the precision gauge relative to said workpiece, said adjustment knob being rotatable about a substantially horizontal axis to react any reaction forces downwardly into said surface.

20. A support stand for a height gauge comprising:
   a) a base for sitting on a surface;
   b) a substantially vertical post pivotally attached to said base;
   c) a support arm for receiving a precision gauge and supporting the gauge relative to a workpiece positioned on said surface;
   d) means for adjustably connecting said support arm to said post;
   e) an adjustment knob for permitting fine adjustment of a position of the precision gauge relative to said workpiece, said adjustment knob being rotatable about a substantially horizontal axis to react any reaction forces downwardly into said surface,
   f) a push nub attached to said adjacent knob which contacts said substantially vertical post and causes it to pivot as said adjustment knob is rotated.

* * * * *